July 1, 1930.  J. H. DOTY  1,769,421
TIRE BUILDING APPARATUS
Filed Aug. 24, 1928  2 Sheets-Sheet 2
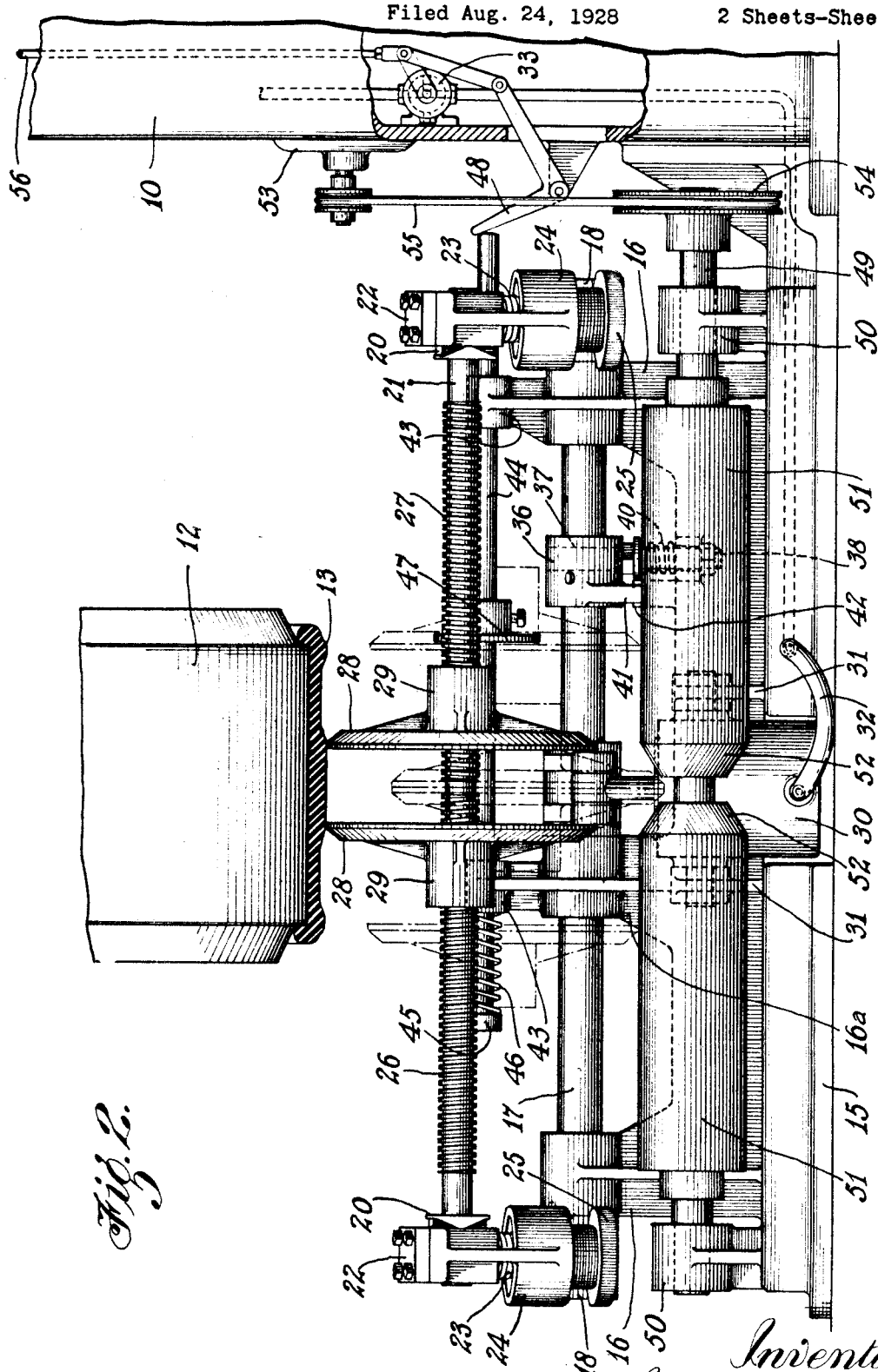

Patented July 1, 1930

1,769,421

UNITED STATES PATENT OFFICE

JOHN H. DOTY, OF AKRON, OHIO, ASSIGNOR TO THE B. F. GOODRICH COMPANY, OF NEW YORK, N. Y., A CORPORATION OF NEW YORK

TIRE-BUILDING APPARATUS

Application filed August 24, 1928. Serial No. 301,774.

The invention relates to tire-building apparatus, and especially to mechanism for rolling down and for compacting the successive plies of fabric and the tread member of a tire structure during the manufacture thereof.

The invention has its primary utility in the manufacture of pneumatic tire casings of the drum-built type wherein it is especially useful in rolling down and compacting the successive carcass plies and the heavy tread member of the tire structure.

The chief objects of my invention are in an improved manner to provide, in tire-building apparatus comprising a tire-stitching tool, for bringing the tool quickly but yieldingly into operative engagement with a tire structure in a medial zone thereof under a determinate pressure, for feeding the tool under the said pressure at a relatively slow rate progressively from the medial zone to the bead portions of the tire structure, and for thereafter quickly restoring the tool to inoperative position; and to provide in apparatus of the class described automatic stitching mechanism for applying a substantially uniform pressure to all portions of the tire structure, the pressure being progressively applied to the various portions in such manner as to remove entrapped air from between the plies of stock and to prevent the objectionable lifting of the fabric or tread rubber from the underlying structure by the receding portions of the presser members or discs.

Of the accompanying drawings:

Fig. 2 is a front elevation of a tire-building machine in which my stitching mechanism is shown operatively engaged with the work, the latter being shown in section.

Figure 1:
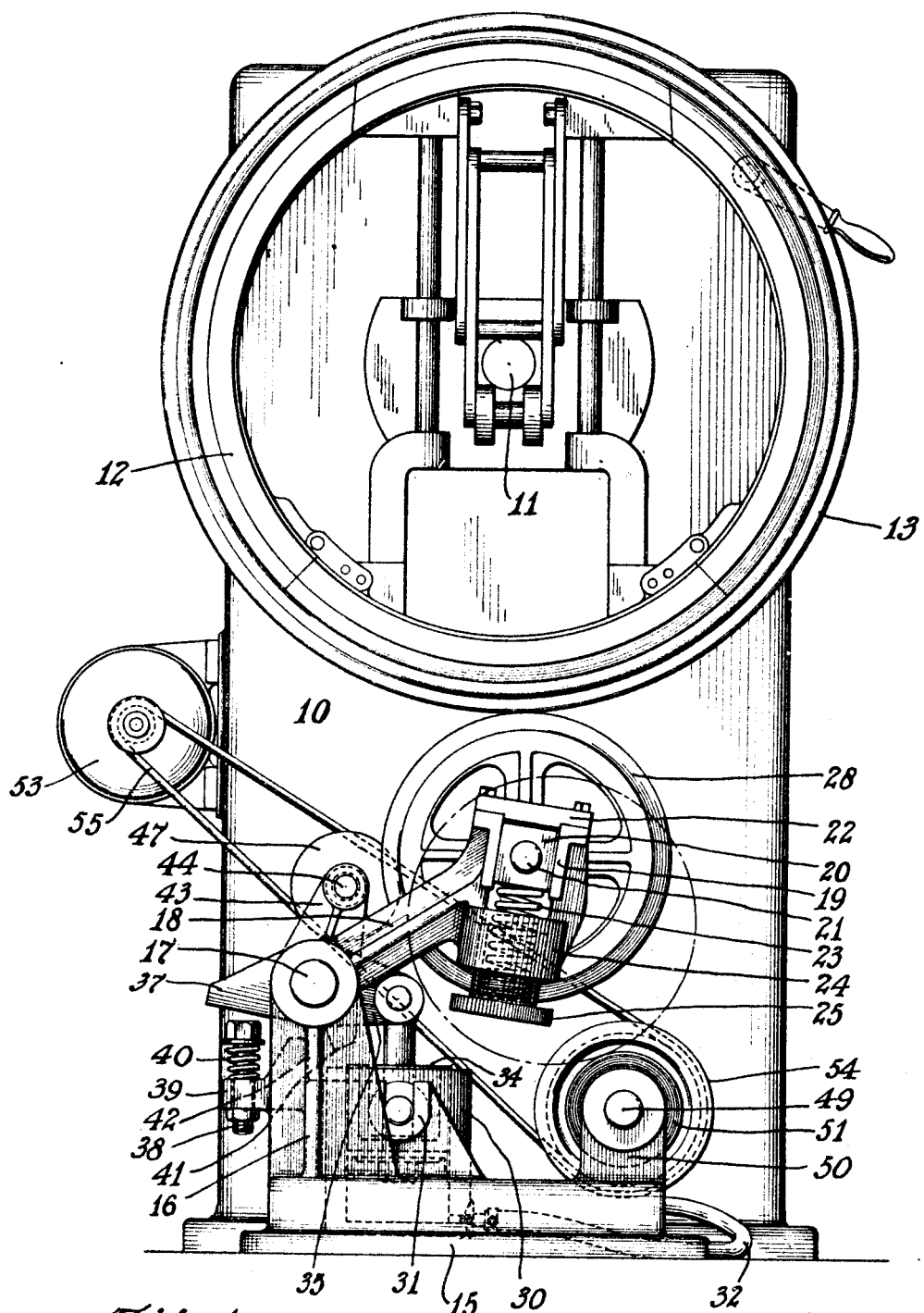
Fig. 1 is a side elevation of a tire-building machine showing the improved stitching mechanism in operative association therewith.

Referring to the drawing, 10 is the frame of a tire-building machine and 11 is a rotatable spindle journaled therein on which is mounted a collapsible tire-building drum 12. A flat tire band 13 is shown mounted on the drum 12 in position to be acted upon by my improved mechanism for rolling down and compacting the plies.

The said mechanism comprises the base frame 15, which may be cast integral with the frame of the tire-building machine 10, and has arranged thereon a plurality of upstanding journal brackets 16, 16, and a journal bracket 16ª, which support a rock shaft 17 near its respective ends and at an intermediate point. A pair of arms 18, 18 are rigidly secured to the rock shaft 17 at its respective ends and beyond the journal brackets 16, 16. Each of the pair of arms 18, 18 has its free end formed with a guideway 19 for a slidable block 20, the upper end of said guideway being closed by a stop plate 22. The two blocks 20, 20 form supports for the respective ends of a threaded stationary rod 21. The bottom face of each of the slidable blocks 20 is engaged by the upper end of a compression spring 23 of which the other end extends into a boss 24 formed on the corresponding arm 18, the spring seating upon an adjustable plug or bolt 25 threaded into the boss from below.

The stationary rod 21 has formed thereon right and left threaded screw portions 26 and 27 respectively extending from its middle point to opposite points near the ends of the rod. A pair of generally disc-shaped stitching tools 28 having threaded axial bearing-portions 29 are mounted for rotation on and movement along the stationary rod 21, one on each of the respective right-hand and left-hand screw portions.

The stitching discs are preferably of relatively large diameter, satisfactory diameters being 10″ to 12″. This provision contributes materially to the securing of a uniform application of pressure to all parts of a tire band and to the even smoothing out of irregularities therein with a relatively small pressure so as to avoid the digging of the stitching disc into the material of the tire band and the removal of any portions of the same by a wiping, dragging or lifting action. The discs may also have the rear of their pressing surfaces rounded to assist in preventing the undesirable wiping action on the pressed fabric.

The mechanism for moving the stitching discs 28 into operative engagement with the tire band 13 comprises a fluid-pressure cylinder 30 pivotally mounted in journal brackets 31, 31, on the base frame, and provided with a flexible fluid supply and discharge pipe 32 having a valve 33 therein. The piston 34 of the cylinder 30 is pivotally connected to an offset portion 35 of the rock shaft 17.

A mechanism is provided for preventing injury to the tire due to impact therewith of the upwardly moving stitching discs 28 under the action of fluid pressure in cylinder 30, the said mechanism comprising a collar 36 rigidly secured to the rock shaft 17, and carrying thereon an arm or shoulder 37 in alignment with and adapted to engage the head or upper end of a plunger rod 38 mounted for sliding movement in a projecting lug 39 on the base frame 15, the rod 38 having a lock nut on the lower end. A compression spring 40 is operatively engaged between the head of the plunger rod and the top of the lug 39, and permits downward movement of the rod against the compressive force of the spring.

The collar 36 has thereon a second arm 41 adapted to limit the rocking movement of shaft 17 caused by the weight of the stitching mechanism. This arm 41 is for this purpose arranged to abut against a shoulder 42 suitably positioned in the base frame 15.

The mechanism for lowering the stitching discs 28 after they have performed their function comprises a pair of bearings 43, 43 formed in the journal brackets 16, 16 and adapted to support a slidable rod member 44 at points intermediate of its length. This slidable rod has one of its ends turned down to form a shoulder 45, a compression spring 46 being operatively interposed between the shoulder 45 and the adjacent bearing 43 so as normally to urge the rod 44 to the left in Fig. 2. A flanged collar 47 rigidly secured to the slidable rod 44 has its flanged portion located in the path of movement of one of the stitching discs 28. A toggle member 48 pivotally mounted on frame 10 is adapted to be moved by the rod 44 and functions through suitable lever members whereby to reverse the valve 33 and to release the fluid pressure in cylinder 30, whereupon the arms 18, 18 and the parts carried thereby are lowered under the influence of their own weight.

A rod 56 is operatively associated with the valve 33 whereby the operator can open the latter when desired.

The mechanism for quickly returning the lowered stitching discs to their original inoperative position centrally of the stationary rod 21 comprises a rotatable shaft 49 journaled at 50, 50, on base frame 15, and so positioned as to have its axis in the path of movement of the stitching discs 28, 28, as they are being lowered. The shaft 49 has secured thereon a pair of rolls 51, 51, of cushioning material, preferably of rubber. The rolls 51, 51, are spaced apart at a point midway of the shaft 49, and the ends of the rolls adjacent each other are bevelled as at 52, 52. Shaft 49 is preferably constantly driven by motor 53 connected thereto by pulley 54 and the endless belt 55, the arrangement being such that the rolls 51, 51 are rotated in a direction to return the stitching discs 28, 28, in contact therewith along the threaded portions of rod 21 to their central, inoperative position. The speed of the discs gradually decreases as they pass over the bevelled portions of the rolls, and the rotation of the discs ceases when the latter reach the portion of shaft 49 intermediate the rolls. Here the stitching discs are held out of contact with the rotating shaft 49 due to the engagement of the arm 41 on the rocker shaft with the shoulder 42 on the base frame 15.

In the inoperative position of the stitching mechanism when at rest the discs are positioned centrally of the shaft 21 with their circumferential portions extending between the rolls 51, 51 but out of contact with the shaft 49.

In the operation of the apparatus the tire is built on the drum 12 in the usual manner. When it is desired to utilize my compacting mechanism either upon the fabric carcass plies or upon the completely fabricated tire, the operator causes the drum 12 to rotate and then admits fluid under pressure into cylinder 30 by raising the valve-operating rod 56. This lifts the arms 18, 18 from their lowered inoperative position to their operative position with the stitching discs 28 in contact with the tire band at a medial portion thereof, this movement being cushioned by action of the compression springs 23 and 40.

The rotation of the tire structure frictionally causes the stitching discs 28 to rotate on and along the respective threaded portions of rod 21 with the result that the tire structure is subjected to rolling pressure circumferentially, which pressure is progressively applied to the tire structure in each direction laterally from its middle. The springs 23, 23 which yieldingly support the disc-carrying rod 21 provide for a substantially uniform pressure being applied by the stitching discs against all parts of the tire band in spite of irregularities in surface contour of the tire band and regardless of the different diameters of the several zones of the latter.

As the stitching discs 28, 28, pass from operative contact with the tire, one of the discs engages the flanged member 47 on the slidable rod 44, whereby the pressure of the fluid in cylinder is released, permitting the arms 18, 18 and the parts carried thereby to swing downwardly under their own weight. In this lowered position, the stitching discs rest upon the constantly driven rolls 51, 51, and are frictionally driven thereby toward each other along the respective threaded portions of rod 21. As they pass onto the bevelled portions of the rolls 51, 51, their speed of rotation gradually decreases. They finally pass from contact with the rolls and come to rest adjacent each other, being held out of contact with the rotating shaft 49 by the engagement of arm 41 with the shoulder 42 of the base frame. The compression spring 46 normally holds the slidable rod 44 in position to allow the collar 47 thereon to contact with one of the stitching discs 28 as the latter passes along rod 21 outwardly from the middle thereof, and it further functions to return the slidable rod 44 to this position after the stitching disc passes from contact with the collar.

I am aware that prior to my discovery tire-building apparatus was known which comprised stitching tools and mechanism for moving the stitching tools laterally of the tire while constantly pressing them upward against the tire to cause their working edges under suitable pressure to follow the lateral contour of the tire so that the stitching operation progresses from the middle to the edges of the tread. However, the apparatus in the prior art of which I am aware lacks any automatic means whereby the stitching tools are fully withdrawn from contact with the tire structure and thereafter returned to their original position upon the completion of each stitching operation, ready for the next stitching operation, and it especially lacks automatic means for exactly returning the stitching members to the same original inoperative position below the middle portion of the tire support after each stitching operation.

My apparatus provides improved automatic mechanism whereby I am able to accomplish the various objects of my invention and whereby I can secure a superior and uniform product while at the same time effecting a substantial saving of time and of labor.

My invention may be modified within the scope of the appended claims.

I claim:

1. Tire-building apparatus comprising a rotatable support for a tire structure and means for rotating the same, a member yieldingly mounted for movement towards and away from the said support, a pair of stitching members so associated with said yielding member as to be pressed against a rotating tire structure on the support and to be spread apart by coaction with the said yielding member as the stitching members are rotated by contact with the tire structure, and means for moving the yielding member away from the rotating tire structure, automatically when the stitching members attain a determinate position.

2. Tire-building apparatus comprising a rotatable support for a tire structure and means for rotating the same, a member yieldingly mounted for movement toward and away from the said support, a pair of stitching members so associated with said yielding member as to be pressed against a rotating tire structure on the support and to be spread apart by coaction with the said yielding member as the stitching members are rotated by contact with the tire structure, automatic means for retracting the yielding member away from the rotating tire structure, and actuating means engaging the respective spaced-apart, stitching members only in their retracted position for moving them toward each other.

3. The apparatus as defined in claim 2 in which the said actuating means is so arranged as to terminate its engagement with the respective stitching members at a determinate point in the path of travel of each of the latter.

4. Tire-building apparatus comprising a rotatable support for a flat band tire structure and means for rotating the same, a pair of stitching members mounted to be moved toward and away from the support, and means for yieldingly pressing the pair of stitching members uniformly and steadily against a tire band being rotated on the support, the said pressing means comprising a threaded member resiliently supported at each end and carrying the pair of stitching members at points substantially equidistant from the middle portion of the member.

5. Tire-building apparatus comprising a rotatable support for a tire structure, a right and left threaded member mounted for movement toward and from the said support, a pair of stitching members provided with respective threads and so associated with said threaded member as to be pressed against a rotating tire structure on the support and to be spread apart by coaction of their threads with those of the said threaded member as the stitching members are rotated by contact with the tire structure, and automatic means for reversing the direction of rotation of the respective stitching members and thereby moving them toward each other upon retraction of the stitcher assembly from the work.

6. Tire-building apparatus comprising a rotatable support for a tire structure and means for rotating the same, a right and left threaded member having mounted thereon a pair of threaded stitching members, means for pressing the stitching members against a rotating tire structure on the said support whereby they are simultaneously rotated and moved longitudinally along the respective threaded portions of the right and left threaded member in opposite directions away from the middle portion thereof, means actuated by a stitching member at a determinate point in its path of movement for lowering the stitching members out of contact with the tire structure, and means for moving the lowered stitching members toward each other.

7. The apparatus as defined in claim 5 in which the automatic means comprises a rotatable shaft having thereon a pair of cushioning rolls spaced apart at the middle portion of the shaft, the adjacent ends of the rolls being bevelled to form sloping shoulders thereon, means for lowering the stitching members on the threaded member until their peripheries engage with the respective rolls, and means for rotating the rolls in a direction to rotate the said stitching members toward each other.

8. Tire-building apparatus comprising a rotatable support for a flat band tire structure and means for rotating the same, a pair of stitching members adapted to be moved away from and towards the support, means for moving the pair of stitching members into contact with a tire band being rotated on the support and for yieldingly pressing the stitching members against the tire band, means for moving the stitching members along the tire band, automatic means at a determinate point in the path of movement of at least one of the stitching members for lowering the stitching members out of contact with the tire band, and automatic means for thereafter moving the stitching members toward each other to their original position adjacent each other.

9. Apparatus as defined in claim 5 in which the threaded member is yieldingly mounted on members substantially equidistant from its middle portion, the stitching discs being positioned symmetrically with respect to the middle of the threaded member so as to equalize the pressure of the respective stitching members upon a tire structure engaged therewith and to permit a uniform pressure to be exerted upon all parts of such tire structure.

In witness whereof I have hereunto set my hand this 8th day of August, 1928.

JOHN H. DOTY.